United States Patent
Tsuchiya et al.

(10) Patent No.: US 7,525,227 B2
(45) Date of Patent: Apr. 28, 2009

(54) SPINDLE MOTOR AND DISK DRIVE UNIT

(75) Inventors: Masahisa Tsuchiya, Isesaki (JP);
Masahiro Nishidate, Isesaki (JP)

(73) Assignee: Tokyo Parts Industrial Co., Ltd.,
Gunma-Ken (JP)

( * ) Notice: Subject to any disclaimer, the term of this patent is extended or adjusted under 35 U.S.C. 154(b) by 394 days.

(21) Appl. No.: 11/440,339

(22) Filed: May 24, 2006

(65) Prior Publication Data

US 2006/0267423 A1  Nov. 30, 2006

(30) Foreign Application Priority Data

May 31, 2005  (JP)  ............. 2005-158450

(51) Int. Cl.
*H02K 5/167*  (2006.01)
*H02K 7/09*  (2006.01)
*H02K 5/24*  (2006.01)
*G11B 19/20*  (2006.01)

(52) U.S. Cl. ............ 310/90; 310/67 R; 310/90.5; 310/154.01

(58) Field of Classification Search ........... 310/0.5, 310/67 R, 190–191, 154.01, 90, 90.5
See application file for complete search history.

(56) References Cited

U.S. PATENT DOCUMENTS

| | | | | |
|---|---|---|---|---|
| 3,433,987 | A * | 3/1969 | Thees | 310/156.47 |
| 4,728,833 | A * | 3/1988 | Shiraki et al. | 310/68 R |
| 4,949,000 | A * | 8/1990 | Petersen | 310/179 |
| 5,300,849 | A * | 4/1994 | Elsasser | 310/90.5 |
| 5,623,382 | A * | 4/1997 | Moritan et al. | 360/99.08 |
| 6,720,694 | B2 * | 4/2004 | Horng et al. | 310/90 |
| 6,727,626 | B2 * | 4/2004 | Horng et al. | 310/190 |
| 6,911,749 | B1 * | 6/2005 | Ho et al. | 310/67 R |
| 7,002,272 | B2 * | 2/2006 | Tsuchiya | 310/85 |
| 7,038,341 | B1 * | 5/2006 | Wang et al. | 310/90.5 |
| 7,253,544 | B2 * | 8/2007 | Wang | 310/90.5 |
| 7,276,826 | B2 * | 10/2007 | Nishidate | 310/67 R |

FOREIGN PATENT DOCUMENTS

| | | |
|---|---|---|
| JP | 9-74705 | 3/1997 |
| JP | 2002-295461 | * 10/2002 |
| JP | 2003-79095 | * 3/2003 |
| JP | 2004-007905 | 1/2004 |
| JP | 2004-30744 | * 1/2004 |

* cited by examiner

*Primary Examiner*—Burton Mullins
(74) *Attorney, Agent, or Firm*—Jordan and Hamburg LLP

(57) ABSTRACT

A simple configuration allows a rotor of a spindle motor to be eccentric in the pickup moving direction, and improves axial run-out caused by clearance between a rotating shaft and bearing. An arc shaped magnetic body is disposed on a base of a spindle motor opposite a drive magnet and in the same direction as the opposing face, thereby generating an attractive force on the outer periphery side of the rotor.

15 Claims, 4 Drawing Sheets

SPINDLE MOTOR AND DISK DRIVE UNIT

BACKGROUND OF THE INVENTION

The present invention relates to a spindle motor for rotatably driving an optical disk, magneto-optical disk or the like, and a disk drive unit comprising the spindle motor and an optical head.

Known disk drive units comprising a head mechanism for reading information recorded in a disk or writing information to a disk include such optical disk and magneto-optical disk drive units as CD, DVD, and MD disk drives.

For such disk drive unit, an outer rotor type brushless motor is employed as a spindle motor for rotatably driving a disk. A rotating shaft of the spindle motor comprises a turntable on which a disk is placed, and is rotatably supported by a stator using a bearing.

A sintered oil-impregnated metal bearing is generally used as the bearing. This is because such a bearing is less expensive than a roller bearing and thus can reduce the costs of a motor and device. However, unlike a roller bearing, clearance is required between a metal bearing and rotating shaft, and due to this clearance, axial run-out of the rotating shaft becomes larger than that with a roller bearing.

This axial run-out of the rotating shaft becomes surface run-out of a disk surface or axial run-out of a disk when a disk is mounted on a turntable and rotatably driven, causing such disadvantages as an optical head being unable to accurately read information from a disk or accurately write information to a disk.

Various constitutions and methods have been proposed as means for preventing axial run-out of a rotating shaft as above. In particular, the present applicant has filed applications, as in Laid-open Japanese Patent No. 2004-7905, wherein a constant force is exerted on a rotor, not only in the rotating shaft direction (the thrust direction), but also in a radial direction using a magnetic force, causing the rotor to be slightly inclined and eccentric in a prescribed direction.

By thus applying a force to a rotor in a prescribed direction, and causing the spindle motor to rotate in a state where the rotor is eccentric in a prescribed direction, axial run-out of a rotating shaft is inhibited and surface run-out and axial run-out of a disk are improved.

On the other hand, in the relative movement of a read head and disk in a disk drive, it is relatively easy for the head mechanism to track disk run-out in the focus direction, and thus signals can be read even with a certain degree of disk run-out. However, in the tracking direction, even though it is possible for the head to follow the disk run-out, greater precision in terms of surface run-out and axial run-out is demanded when compared to the focus direction.

For this reason, a technology is disclosed in Laid-open Japanese Patent No. H09-74705, wherein read head moving direction is correlated with the direction of eccentricity of a spindle motor rotor.

As suggested in Laid-open Japanese Patent No. 2004-7905, with a disk drive unit configured such that a rotor is made eccentric using a magnetic generator disposed on the rotor and a magnetic attractor covering a bearing end on the stator side, because an attractive force is exerted near the rotating shaft, obtaining sufficient eccentric action is difficult unless this attractive force is strong.

Further, as shown in Laid-open Japanese Patent No. H09-74705, for a disk drive using an optical read head, a constitution wherein a rotor is eccentric in a head moving direction is considered effective. In such a constitution, a prescribed section of a magnetic plate shaped stator core comprising a plurality of stacked magnetic plates is cut away, thereby creating magnetic unbalance with respect to a drive magnet provided on a rotor, thus causing the rotor to be eccentric in a certain direction.

Such a constitution requires not only the processing of each magnetic plate into a prescribed form, but also the assembly of the processed magnetic plates in a set combination. Further, because assembling a stator core as a drive device requires that the assembling direction be determined, such assembly is extremely troublesome.

Further, because a specialized motor is required for such a disk drive, the use of such motor is also limited.

It is therefore an object of the present invention to provide a versatile spindle motor and a disk drive unit using the motor while using a simple constitution to efficiently make a rotor eccentric.

SUMMARY OF THE INVENTION

In order to solve the above problems, the present invention utilizes a spindle motor comprising a rotor having a turntable on which a disk is placed, and a stator for rotatably supporting the rotor, wherein the rotor has a rotating shaft, a rotor case rotating integrally with the rotating shaft, a drive magnet fixed in the rotor case, and an annular magnet fixed more toward the inner periphery side than the drive magnet; the stator has a plate-like base, a sintered oil-impregnated bearing fixed on the base that rotatably supports the rotating shaft, a magnetic cap that covers the rotor side end of the sintered oil-impregnated bearing, a core disposed around the sintered oil-impregnated metal bearing and having a coil wound thereupon, and an arc shaped magnetic body disposed at a position opposite the drive magnet of the base; the magnetic cap has an opposing face partly protruding toward the annular magnet side between the end of the sintered oil-impregnated bearing and the annular magnet; and the arc shaped magnet is disposed at a position that includes symmetric axis direction of the opposite face passing through the rotation center axis line of the rotor.

In accordance with an advantageous embodiment of the invention, the rotor side end surface of the sintered oil-impregnated bearing that rotatably supports the rotating shaft of the rotor is covered with a magnetic cap. The opposing face provided on a portion of the magnetic cap is formed in a shape so as to be near the annular magnet provided on the rotor. For this reason, the rotor becomes eccentric due to the attractive force between the opposing face near the annular magnet and the annular magnet, and the magnetic cap covers the end surface of the sintered oil-impregnated bearing, thereby preventing oil from scattering. Further, the stator base has an arc shaped magnetic body attached thereto opposite the drive magnet, attracting the rotor outer periphery so as to cause eccentricity. Thus, because the arc shaped magnetic body is disposed at a position that includes the symmetrical axis direction of the opposing face that passes through the rotation center axis line of the rotor (axis line Z described below), that is, because the opposing face of the magnetic cap and the arc shaped magnetic body are disposed in a prescribed direction moving outwards from the rotating center of the rotor outwards, the causing-to-be-eccentric can be efficiently performed.

Here, the symmetric axis direction of the opposing face of the magnetic cap means, for example, the axis line Y direction described in the best mode to carry out the invention (described below). In the spindle motor according to the aforementioned embodiment, the axis line Y direction is one example, and no particular limitations are placed with respect to the embodiments.

Further, as shown in a further embodiment in accordance with the invention, when the symmetric axis direction of the opposing face substantially matches the symmetric axis direction of the arc shaped magnetic body, the eccentricity action is maximized, achieving better effects. In other words, because the action to make the rotor eccentric is concentrated in one direction, rotation loss caused by an attractive force not contributing to the eccentricity can be suppressed, allowing reliable eccentricity.

Further, as shown in additional advantageous embodiments, a constitution wherein both opening angles of the opposing face and the arc shaped magnetic body are 180° or less, and a constitution wherein the opening angle of the arc shaped magnetic body is no greater than the opening angle of the opposing face can be suitably employed. With such constitutions, rotation loss caused by an attractive force not contributing to eccentricity can be further efficiently inhibited, allowing reliable eccentricity.

Further, as shown in another advantageous embodiment, a constitution wherein the rotor case comprises a cylindrical portion formed coaxially with the rotating shaft and in a cylindrical shape and an upper surface having a surface orthogonal to the rotating shaft, the drive magnet is attached to the cylindrical portion, and the annular magnet is attached to the upper surface, can be suitably employed.

Further, the present application, as an invention of a disk drive, includes inventions of a disk drive unit comprising the above described spindle motor and a read head moving in a direction orthogonal to the central axis of rotation of the spindle motor.

With such a disk drive unit, when the read head moving direction substantially matches the symmetric axis direction of the opposing face, signals recorded on the disk can be more reliably read.

According to the present invention, using a simple configuration of an annular magnet and magnetic cap opposite the annular magnet, a rotor can be made eccentric while oil scattering is prevented, and/or a rotor can be put in a state where it is pulled in an axial direction. Further, because an arc shaped magnetic body is provided at a position that includes the symmetric axis direction of the opposing face that passes through rotation center axis line of the rotor (axis line Z described below), and the outside of the rotor is pulled in the rotating shaft direction using this arc shaped magnetic body, greater eccentricity can be achieved.

Thus, the present application provides a small spindle motor that improves axial run-out, prevents oil from scattering, and has excellent versatility, and a disk drive unit using the motor.

The above, and other objects, features and advantages of the present invention will become apparent from the following description read in conjunction with the accompanying drawings.

DETAILED DESCRIPTION OF THE PREFERRED EMBODIMENTS

Figure 1:
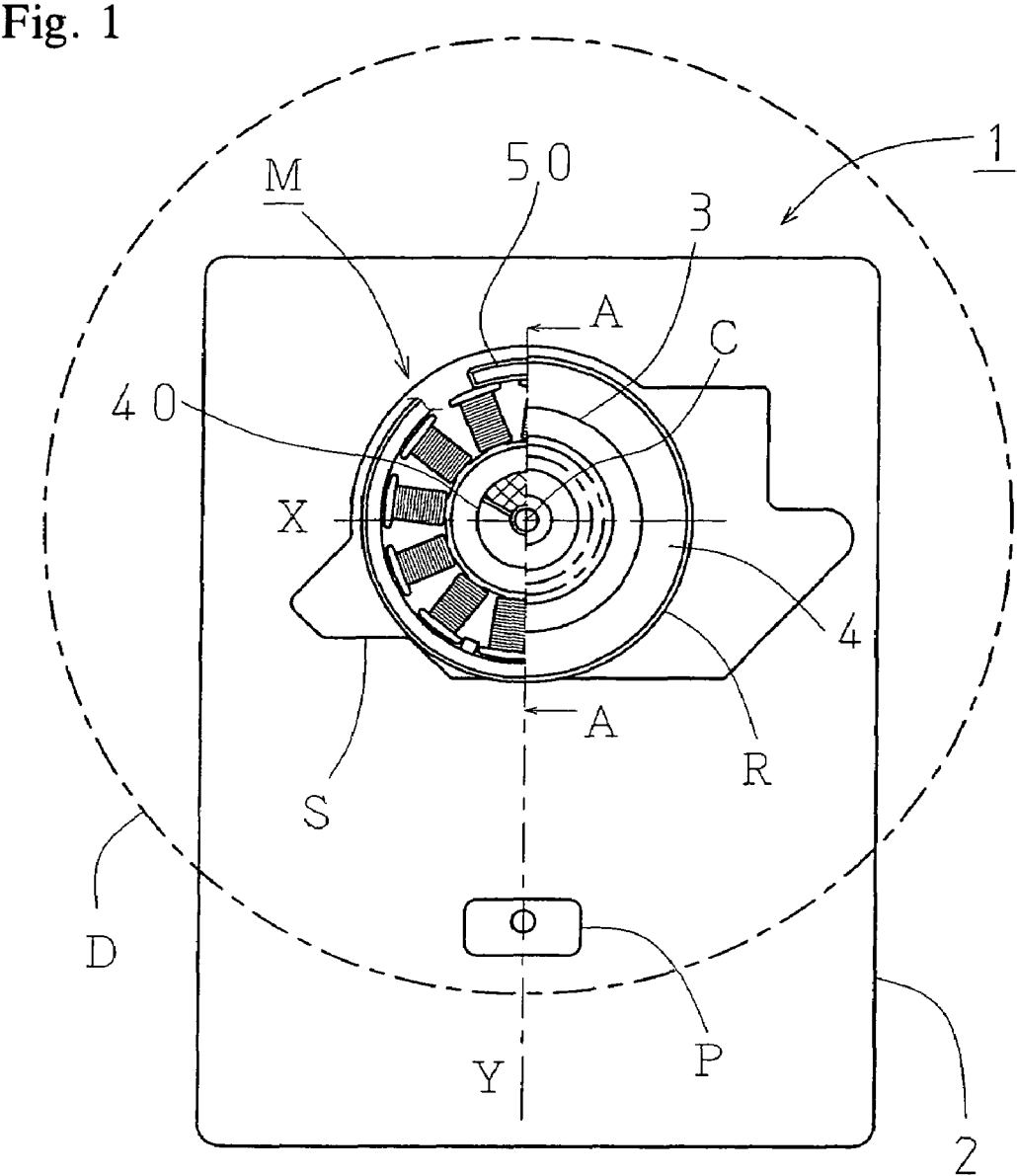
FIG. 1 is a plan view showing a disk drive unit of the present invention, having half the rotor shown as a cross-section along the line A-A.

A disk drive unit according to the present invention will be explained with reference to FIG. 1. FIG. 1 is a plan view showing a disk drive unit, with the upper surface of the rotor cut in half along the line A-A and a portion of the rotor outer periphery cut away.

A disk drive 1 comprises, on a chassis 2, a spindle motor M and a pickup P that serves as a read head. The pickup P is attached on the chassis 2 so that the optical axis of a laser beam passes through a rotation center C of the spindle motor M and moves along an axis line Y (first axis line) parallel to the rotation plane of a disk D. Explanations of a mechanism to move a pickup, signal processing, a motor drive circuit and the like are omitted, as they do not directly relate to the present invention.

Here, to simplify the explanation, a line passing through the rotation center C, parallel to the rotation plane of the disk D, and intersecting with the axis line Y at right angles shall be designated axis line X. Further, an axis line (spindle motor rotation center axis line) passing through the rotation center C and orthogonal to the axis line X and axis line Y shall be designated axis line Z.

The spindle motor M comprises a stator S and rotor R, the rotor R having a disk guide 3 and friction sheet 4 provided so as to function as a turntable. The turntable may be fixed on a rotating shaft as a separate body from a rotor case. The constitution of such spindle motor will be described later.

The disk D is placed on the turntable formed on the rotor R. The disk D is centered by the disk guide 3, placed on the turntable, and rotated by the spindle motor M centering on the axis line Z.

The stator S has attached thereupon a magnetic cap 40 and an arc shaped magnetic body (arc shaped magnetic metal piece) 50, both characteristic to the present invention. In this embodiment, an opposing face 40a of the magnetic cap 40 (details will be described below) and arc shaped magnetic body 50 are attached opposite the pickup P with respect to the axis line X (opposing face 40a of the magnetic cap 40 is cross-hatched in the drawing) so as to be symmetric with respect to the axis line Y, and asymmetric with respect to the axis line X.

Figure 2:
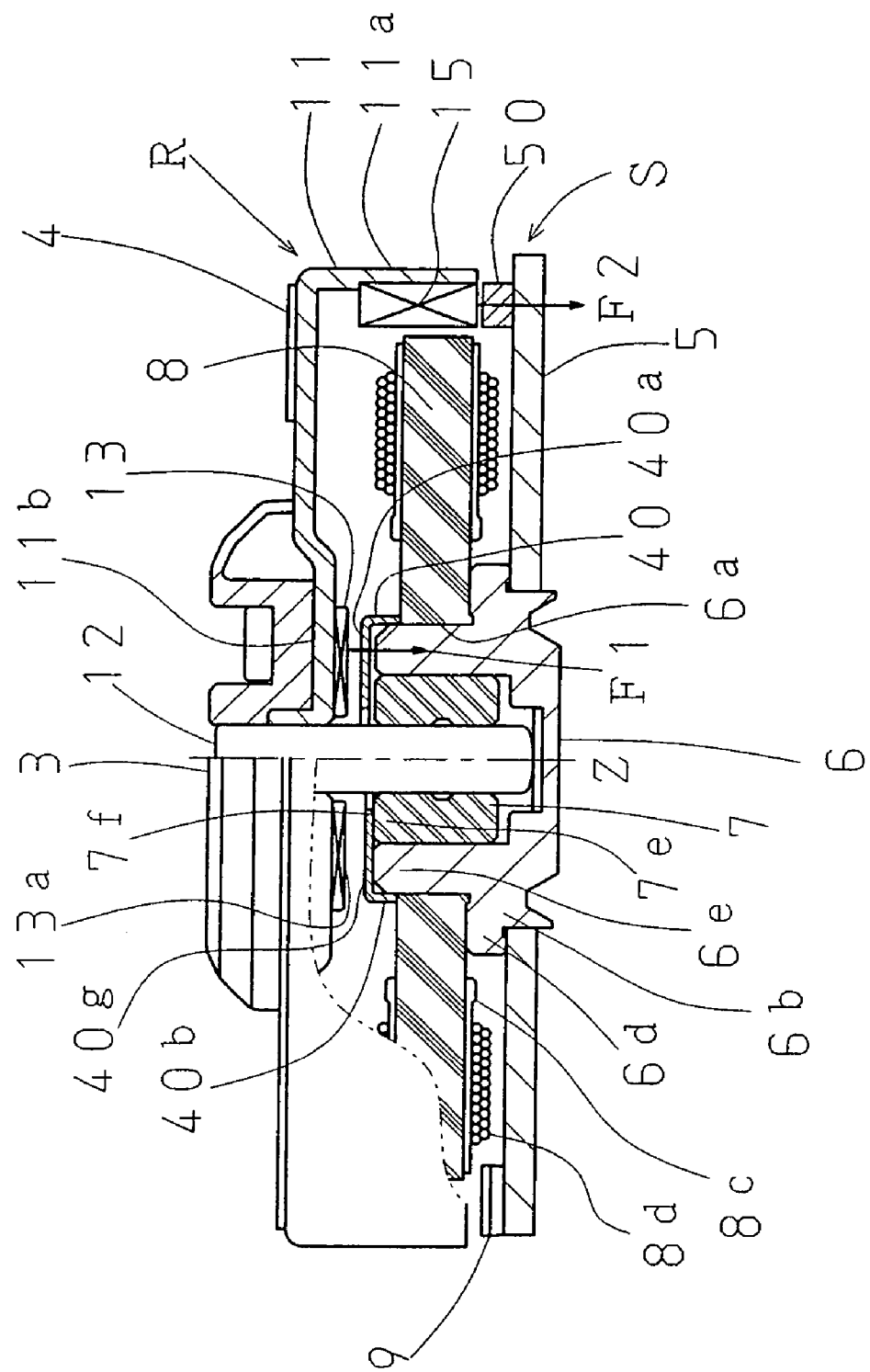
FIG. 2 is a side view of a spindle motor used for the disk drive unit of the present invention, showing a cross section along the line A-A of FIG. 1.
Figure 3:
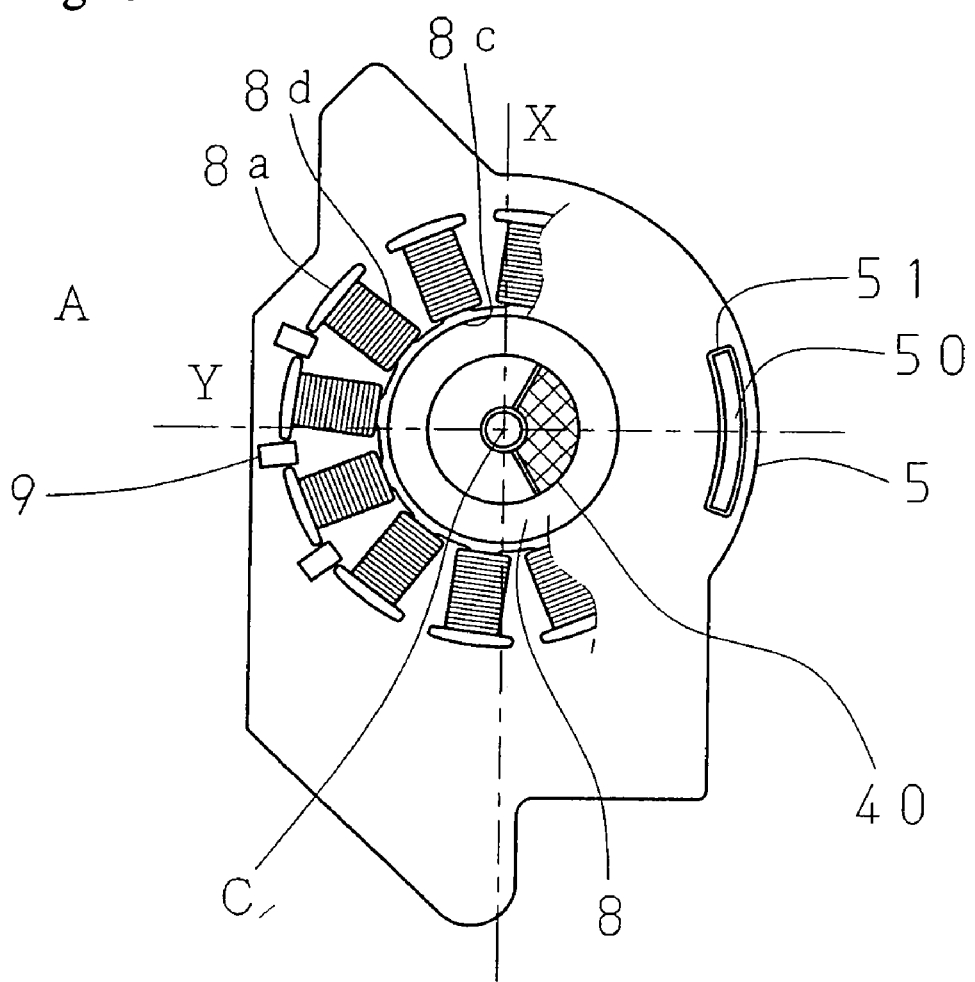
FIG. 3 is a plan view of a spindle motor used for the disk drive unit of the present invention showing a stator.

The spindle motor M used in the disk drive unit 1 of the present invention will be explained with reference to FIGS. 2 and 3. FIG. 2 is a lateral cross-sectional view of the spindle motor M along the line A-A on the axis line Y. FIG. 3 is a plan view of the stator S, in which a portion of the stacked core is omitted.

The stator S comprises a base 5 comprising an iron substrate having a printed circuit formed on the surface thereof or a printed wiring board on which iron plates are stacked and attached, and attached to the base is a brass bearing holder 6 that is, for example, machine cut in a cylindrical form. The bearing holder 6 is integrally molded in a cup shape and comprises a cylindrical guide 6a accommodating therein a sintered oil-impregnated metal bearing 7 and to the outside of which a stacked core 8 is attached, a fixing part 6b that fixes the bearing holder 6 to the base 5 by crimping or the like, and a holding part 6d for supporting the rotor R in a thrust direction and holding the stacked core 8.

The bearing holder 6 serves to constitute the bearing 7 as a part of the stator. Therefore, the bearing holder 6 can be integrally formed of the same material as that of the bearing, or may be formed of a resin or the like integral with a base material (a base constituting the stator). Various such constitutions are possible, including a constitution where a bearing holder is formed of an iron plate or the like and made integral with the base material.

For example, the bearing holder 6, in addition to brass, may be formed of resin or metal plate, and in such cases, the bearing holder 6 may be formed integrally with the base 5. In particular, when the bearing holder 6 is formed of a magnetic plate material, the bearing holder 6 and magnetic cap 40 can be integrally formed by pressing.

The bearing 7 is a bearing in which lubricant is impregnated in cylindrically shaped sintered metal, as is generally used for such a motor. The bearing 7 is fixed to an inner periphery side of a guide 6a by press insertion or the like. In the embodiment shown in FIG. 2, an end 6e of the bearing holder 6 is attached to an end 7e of the bearing 7 so that the height of the end face is the same as that of the end face 7f of the bearing 7.

The stacked core 8 comprises stacked plates on which a plurality of salient poles 8a are formed. The stacked core 8 is fixed on the outer periphery of the guide 6a so as to be held by the holding part 6d with respect to the base 5. An insulating sheet 8c is inserted in the salient poles 8a, and a coil 8d is wound around each salient pole 8a.

A sensor 9 is a Hall sensor provided on the base 5 for detecting rotation of the rotor.

The arc shaped magnetic body 50 is formed in an arc shape centered around the rotation center C with a rectangular cross section, formed of a magnetic material such as a standard iron plate, ferrite and the like, and attached to the base 5 so as to be symmetric along the axis line Y.

The position of attachment of the arc shaped magnetic body 50 with respect to the rotation center C is a position opposite the drive magnet 15 (described below), and the curvature thereof is roughly equivalent to that of the drive magnet 15. The length of the arc shaped magnetic body 50 in the circumferential direction in the case of this embodiment is formed so as to have an opening angle of 40° centering on the rotation center C (opening angle of 20° on one side with respect to the axis line Y), and the width in the radial direction is set to be roughly equivalent to the width of the drive magnet 15 in the radial direction.

To position the arc shaped magnetic body 50, a printed wiring pattern 51 formed on the base 5 can be used. If the printed wiring pattern 51 is formed in a shape roughly identical to the arc shaped magnetic body 50, independently from other patterns and at the position at which it is desired that the arc shaped magnetic body 50 be disposed, and the arc shaped magnetic body 50 is fixed to the printed wiring pattern 51 by an adhesive, soldering or the like, the arc shaped magnetic body 50 can be accurately disposed without any variation.

With the arc shaped magnetic body 50 thus disposed, the arc shaped magnetic body 50 operates with the drive magnet 15, causing an attractive force F2 to act on the rotor R. Because the attractive force F2 acts along the axis line Y so as to attract the drive magnet 15 toward the base 5, the rotor R becomes eccentric along the axis line Y direction, in the direction opposite the pickup P.

Further, because the position at which the arc shaped magnetic body 50 is attached is spaced apart from the rotation center C, at the outermost periphery of the rotor R, the eccentric action increases even with a relatively small attractive force F2.

The rotor R comprises a cap-like rotor case 11 formed of a magnetic plate material enabling formation of a magnetic path, a rotating shaft 12 fixed on the rotor case 11 and rotatably supported by the bearing 7, a disk guide 3 formed integrally with the rotor case 11 and rotating shaft 12 so as to cause the rotor R to function as a turntable, and a friction sheet 4.

The rotor case 11 comprises a cylindrical part 11a formed in a cylindrical shape and provided coaxially with the rotating shaft 12, and an upper surface 11b having a surface orthogonal to the rotating shaft 12. A cylindrical drive magnet 15 opposite the salient poles 8a is attached to the inner side of the cylindrical part 11a of the rotor case 11. The drive magnet 15 has a plurality of N and S poles magnetized alternatingly in the circumferential direction. Further, a disk guide 3 and friction sheet 4 are provided on the upper surface 11b of the rotor case 11.

On the inner periphery side inner surface of the upper surface 11b, an annular magnet 13 is attached at a position opposite the magnetic cap 40, with the rotating shaft 12 at the center thereof, the annular magnet 13 having a substantially rectangular cross-sectional shape and a surface 13a orthogonal to the shaft 12. This annular magnet 13 is magnetized into two poles, N and S, in the axis line Z direction.

This annular magnet 13 is attached to the upper surface 11b of the rotor case 11, but no such limitation is imposed. For example, in a configuration such that the disk guide 3 having the center of the upper surface 11b as a circular opening is integrally formed from resin, the annular magnet 13 may be attached at a position opposite the magnetic cap 40 of the disk guide 3.

Further, the inner diameter of the annular magnet 13 is configured to be the same size as or slightly smaller than the opening 40c of the magnetic cap 40 through which the rotating shaft 12 passes, and the outer diameter thereof is configured to be slightly larger than the outer diameter of the magnetic cap 40. In a case where the magnetic cap 40 is attached to the end 6e of the bearing holder 6, the diameter thereof is relatively large. As a result, the attractive force F1 caused by the annular magnet 13 becomes large.

In a case where the end 7e of the bearing 7 is formed in a shape so as to protrude past the end 6e of the bearing holder 6 and the magnetic cap 40 is directly attached to the bearing 7, the outer diameter of the magnetic cap 40 will be smaller than in this embodiment, but the outer diameter of the annular magnet 13 will still be the same size as the outer diameter of the magnetic cap 40 or slightly larger. In other words, enlarging the outer diameter of the annular magnet 13 more than necessary would not increase the attractive force F1

More specifically, excellent efficiency can be achieved if the annular magnet 13 and a ceiling 41 (described below) of the magnetic cap 40 are configured so as to have roughly equivalent inner and outer diameters, or if the surface 13a is slightly larger in a radial direction than the ceiling 41.

In other words, good effects are obtained whether the inner diameter and outer diameter of the surface 13a of the annular magnet 13 and a ceiling 41 (described below) of the magnetic cap 40 are roughly the same size, or whether the surface 13a is configured to be slightly larger in a radial direction than the ceiling 41.

Figure 4A:
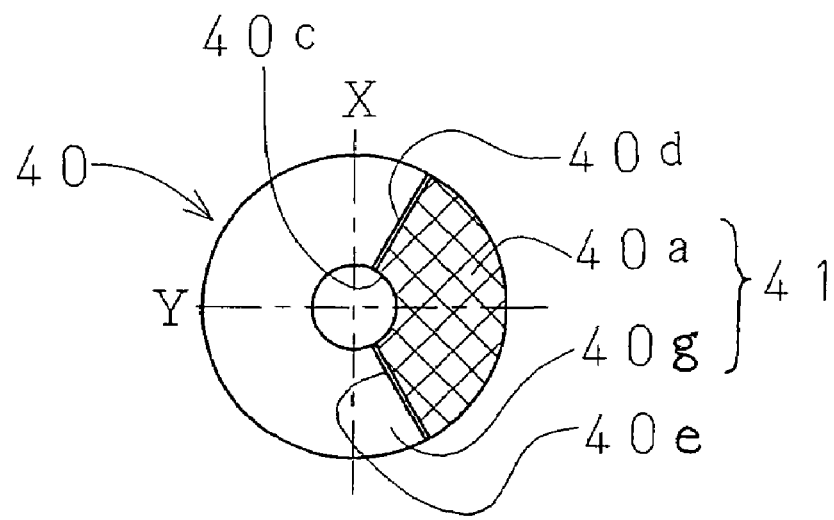
FIG. 4 is a figure showing details of an example of a magnetic cap used in the disk drive of the present invention, showing (a) a plan view thereof, and (b) a lateral cross-section along the line A-A on the axis line Y.
Figure 4B:
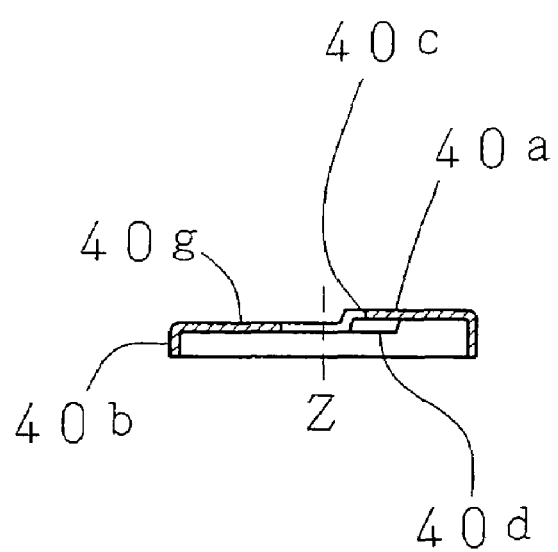

The magnetic cap 40 will be explained in detail with reference to FIG. 4. FIG. 4(a) is a plan view of the magnetic cap 40 and FIG. 4(b) is a lateral cross-section view along the line A-A of the axis line Y.

The magnetic cap 40 is formed of a ferromagnetic thin iron plate or the like, for example, a silver top, SECE material or the like having a thickness of 0.25 mm. The magnetic cap 40 is formed in a cap-like shape, and comprises an opposing face 40a (indicated in FIG. 4(a) by cross-hatching) which is a flat surface orthogonal to the axis line Z, a lid 40g orthogonal to the axis line Z as well and on a different plane from the opposing face 40a, and a cylindrical attaching part 40b concentric with the axis line Z. The opposing face 40a is opposite to and parallel with the surface 13a of the annular magnet 13.

The opposing face 40a and lid 40g are formed in an annular shape, connected to each other by steps 40d, 40e, forming a ceiling 41 that serves as an annular magnetic material. The steps are from 0.1 mm to 0.2 mm. The steps are formed so that the opposing face 40a necessarily projects more toward the rotor than the lid 40g. More specifically, the ceiling 41 is positioned between the end surface 7f of the bearing 7 and the surface 13a of the annular magnet 13, and the opposing face 40a is closer to the surface 13a of the annular magnet 13 than the lid 40g.

Further, the ceiling 41 is connected with the attaching part 40b at the outer periphery thereof, and at the center, a circular opening 40c is formed so that contact is not made with the shaft 12, and the ceiling covers the end face 7f of the bearing 7.

The attaching part 40b has an inner diameter roughly equivalent to the outer diameter of the guide 6a of the bearing holder 6. The attaching part 40b is mounted to the end 6e of the guide 6b, adhered to the guide 6b, and fixed thereto by crimping or the like. When the inner diameter of the attaching part 40b is slightly smaller than the outer diameter of the guide 6a, the attaching part 40b can be fixed thereto by press insertion.

The attaching part 40b is thus used to attach the magnetic cap 40. Alternatively, the ceiling 41 may be directly attached to the end 6e of the bearing holder 6 by welding or the like. Further, when the bearing holder 6 is formed of a magnetic metal plate as described above, the ceiling part 41 may be formed continuously with the bearing holder.

Because the magnetic cap 40 is formed of a magnetic metal thin plate, such a shape can be formed by pressing. Further, the shape shown in FIG. 4 is such that the opposing face 40a is formed on a ceiling having a uniform thickness. Alternatively, also by pressing, the opposing face 40a may be made thicker and the lid 40g made thinner, so that the opposing face protrudes.

The ceiling 41 thus configured will not protrude to a large degree from the ends 7e, 6e of the bearing 7 and bearing holder 6. For this reason, the annular magnet 13 can be made small and will not affect the shape of surrounding parts, thereby enabling greater freedom of design without increasing motor size.

Further, when the magnetic cap 40 is formed in a cap-like shape having on the ceiling 41 an opening through which the shaft passes, the magnetic cap 40 can be easily attached to the cylindrical attaching part 40b without need to increase the size of the ceiling 41.

Further, because this magnetic cap 40 is formed in an annular shape so that the opposing face 40a and lid 40g are continuous with each other, and the end surface 7f of the bearing 7 is covered, oil impregnated in the bearing 7 can be prevented from scattering.

The opposing face 40a is formed so as to be symmetric along the axis line Y. The length thereof in the circumferential direction in case of the present embodiment is formed so as to have an opening angle of 120° centering on the rotation center C (opening angle of 60° on one side with respect to the axis line Y).

The width of the opposing face 40a (difference between the diameters of the cylindrical part 40b and opening 40c) is made to match the annular magnet 13 opposite thereto, and determined as appropriate depending on the desired attractive force F1. In this case, it is desirable that the surface 13a of the annular magnet 13 have the same width as that of the ring surface or larger. Further, good effects are obtained if the surface 13a is opposite to and parallel with the opposing face 40a. If the differential between the lid 40g and opposing face 40a is secured, the lid 40g does not have to be flatter than the opposing face 40a.

The rotor R is configured such that the attractive force F1 is exerted in the Z direction by the action of the annular magnet 13 and opposing face 40a. Because the opposing face 40a is symmetrical along the axis line Y in the present embodiment, the combined force is exerted along the axis line Y. More specifically, the attractive force F1 operates on the rotor R so as to cause it to be eccentric in the direction moving away from the pickup P, and the inclination direction thereof corresponds to the axis line Y. When the moving direction of the pickup P and eccentric direction thus match, the pickup P can accurately read/write information.

Further, because the steps between the opposing face 40a and lid 40g of the magnetic cap 40 are from 0.1 mm to 0.2 mm, the annular magnet 13 also operates on the lid 40g. In other words, because the attractive force F1 operates so as to make the rotor R eccentric, and the circular opposing face 40a and lid 40g cause an attractive force to be exerted in the Z direction of the rotation center axis line of the rotor, rotation of the rotor R is stable.

In general, it is preferable, in order to keep the rotating shaft 12 eccentric in a set direction, to locally create magnetic unbalance within an extremely narrow range. However, locally creating magnetic unbalance makes it difficult to achieve a sufficient attractive force.

Thus, with the present invention, magnetic unbalance is created on the inner periphery side using the opposing face 40a of the magnetic cap 40 and annular magnet 13, and magnetic unbalance is created on the outer periphery side using the arc shaped magnetic body 50 and drive magnet 15, thereby achieving efficient eccentricity of the rotor by an attractive force caused by the magnetic unbalances. In other words, the arc shaped magnetic body 50 is disposed at a position that includes the symmetric axis direction of the opposing face 40a (axis line Y direction in the above example) that passes through the rotation center axis line of the rotor (axis line Z), thereby allowing the attractive forces F1 and F2 to sufficiently act in an overlapping manner.

With the present invention, as described in the above embodiment, if the symmetric axis direction of the opposing face 40a that passes through the rotation center axis line of the rotor substantially matches the symmetric axis direction of the arc shaped magnetic body 50 that also passes through the rotation center axis line of the rotor, the eccentric action is maximized, achieving greater effects. In other words, because the action making the rotor eccentric is concentrated in one direction, reliable eccentricity can be achieved even with a relatively weak attractive force.

Further, if both opening angles of the opposing face 40a and arc shaped magnetic body 50 are 180° or less, and the opening angle of the arc shaped magnetic body 50 is smaller than that of the opposing face 40a, rotation loss caused by an attractive force not contributing to eccentricity is effectively suppressed, ensuring reliable eccentricity.

As described above, because the arc shaped magnetic body 50 can be positioned relatively easily, the arc shaped magnetic body 50 can be easily disposed so as to be symmetric along the axis line Y. Further, because the magnetic cap 40 is attached to, for example, the end of the cylindrical bearing 7, positioning is relatively difficult, and accurate symmetry along the axis line Y may not be achieved. However, if the arc shaped magnetic body 50 is disposed at a position that includes the opposing face 40a in the symmetric axis direction (axis line Y direction in the above example), rotation loss caused by an attractive force not contributing to eccentricity can be suppressed, allowing sufficient and effective rotor eccentricity.

Further, with the present invention, as in the embodiment explained above, effective characteristics can be achieved if the axis line Y direction is the same direction as the pickup moving direction. Alternatively, the axis line Y may be orthogonal to the pickup moving direction (i.e. axis line X direction), or a direction inclined in a prescribed angle with respect to the axis line Y direction, with such determinations to be made, as appropriate, depending on the conditions in which the drive device unit is to be used.

As a material of the magnetic cap 40, in addition to a magnetic metal plate, a resin containing magnetic powder mixed therein may be used to mold the same.

Further, the above embodiment explained the constitution of a radial air-gap type outer rotor type brushless motor, but the present invention can be employed also for an outer rotation type axial air-gap type motors. When the rotor is as an axial air-gap type, a drive magnet and annular magnet can be used together.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A disk drive device, comprising:
   a spindle motor for rotatably driving a disk-shaped recording medium when received thereto, the spindle motor including a stator, a rotor including a rotating shaft, a cylindrical bearing disposed on the stator supporting the rotating shaft, a drive magnet fixed on the rotor case, and a generally arc shaped magnetic body disposed at a radial position opposite the drive magnet having a central axis generally aligned with the center axis line of the rotor; and
   a read head movable along a symmetric axis of said generally arc shaped magnetic body.

2. A disk drive device according to claim 1, wherein an opening angle of said generally arc shaped magnetic body is approximately 40°.

3. A disk drive device according to claim 1, wherein an opening angle of said generally arc shaped magnetic body is not greater than 180°.

4. A disk drive device according to claim 1, wherein a width of said generally arc shaped magnetic body in a radial direction is approximately equivalent to a corresponding width of the drive magnet.

5. A spindle motor, comprising a rotor having a turntable on which a disk is placed, and a stator for rotatably supporting the rotor, wherein:
   the rotor includes:
      a rotating shaft;
      a rotor case rotating integrally with the rotating shaft;
      a drive magnet fixed on the rotor case, and
      an annular magnet fixed more to the inner periphery side than the drive magnet;
   the stator includes:
      a generally plate-shaped base;
      a sintered oil-impregnated bearing fixed on the base for rotatably supporting the rotating shaft;
      a magnetic cap covering the rotor side end of the sintered oil-impregnated bearing;
      a core disposed around the sintered oil-impregnated bearing and having a coil wound thereupon; and
      a generally arc shaped magnetic body disposed at a position opposite the drive magnet;
   the magnetic cap having an opposing face partly protruding toward the annular magnet, between the sintered oil-impregnated bearing end and the annular magnet; and
   said opposing face being symmetric about a radial axis which extends radially outwardly from a rotation center axis of the rotor, the generally arc shaped magnetic body being position such that said radial axis passes through said arc shaped magnetic body.

6. The spindle motor according to claim 5, wherein the radial axis about which the opposing face is symmetric substantially matches a corresponding radial axis about which the generally arc shaped magnetic body is symmetric.

7. The spindle motor according to claim 5, wherein the opening angles of both the opposing face and the generally arc shaped magnetic body are not greater than 180°.

8. The spindle motor according to claim 7, wherein the opening angle of the generally arc shaped magnetic body is not greater than the opening angle of the opposing face.

9. The spindle motor according to claim 5, wherein:
   the rotor case comprises a cylindrical portion formed coaxially with the rotating shaft and formed in a cylindrical shape, an upper surface having a surface orthogonal to the rotating shaft; and
   the drive magnet is attached to the cylindrical portion, and the annular magnet is attached to the upper surface.

10. A disk drive unit, comprising:
   a spindle motor including a rotor having a turntable on which a disk is placed and a stator for rotatably supporting the rotor, and a read head moving in a direction intersecting with a rotation center axis line of the spindle motor at right angles, wherein:
   the rotor includes:
      a rotating shaft;
      a rotor case rotating integrally with the rotating shaft;
      a drive magnet fixed on the rotor case, and
      an annular magnet fixed more to the inner periphery side than the drive magnet;
   the stator includes:
      a generally plate-shaped base;
      a sintered oil-impregnated bearing fixed on the base for rotatably supporting the rotating shaft;
      a magnetic cap covering the rotor side end of the sintered oil-impregnated bearing;
      a core disposed around the sintered oil-impregnated bearing and having a coil wound thereupon; and
      a generally arc shaped magnetic body disposed at a position opposite the drive magnet;
   the magnetic cap having an opposing face partly protruding toward the annular magnet, between the sintered oil-impregnated bearing end and the annular magnet; and
   said opposing face being symmetric about a radial axis which extends radially outwardly from a rotation center axis of the rotor, the generally arc shaped magnetic body being position such that said radial axis passes through said arc shaped magnetic body.

11. The disk drive unit according to claim 10, wherein the read head moving direction is substantially aligned with said radial axis about which the opposing face is symmetric.

12. A spindle motor, comprising:
- a stator;
- a rotor including a rotating shaft rotatable about a center axis line, and a rotor case rotatable integrally with the rotating shaft;
- a cylindrical bearing disposed on the stator supporting the rotating shaft;
- a drive magnet fixed on the rotor case; and
- a generally arc shaped magnetic body having a symmetric axis, said generally arc shaped magnetic body being radially positioned opposite the drive magnet such that a central axis of the generally arc shape magnetic body is approximately aligned with the center axis line of the rotor; and
- a magnetic cap covering a rotor-end side of the bearing and opposing an annular magnet, at least a ceiling portion of said magnetic cap being positioned between the rotor-end side of the bearing and the magnet, said magnetic cap including an opposing face having a projected portion which is disposed within a sector of said at least the ceiling portion of the magnetic cap, said magnetic cap being configured such that an outer surface of said projected portion facing said magnet is located closer to said magnet than a remaining sector of said at least a ceiling portion of the magnetic cap.

13. The spindle motor according to claim 12, wherein opening angles of both the opposing face and the generally arc shaped magnetic body are not greater than 180°.

14. The spindle motor according to claim 12, wherein opening angle of the generally arc shaped magnetic body is not greater than a corresponding opening angle of the opposing face.

15. The spindle motor according to claim 12, wherein an opening angle of the generally arc shaped magnetic body is not greater than a corresponding opening angle of the opposing face.

* * * * *